United States Patent
Neidlinger

(10) Patent No.: US 6,744,219 B2
(45) Date of Patent: Jun. 1, 2004

(54) OPERATING CIRCUIT FOR A DISCHARGE LAMP WITH PREHEATABLE ELECTRODES

(75) Inventor: Thomas Neidlinger, Blaustein (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 0 days.

(21) Appl. No.: 10/227,951

(22) Filed: Aug. 27, 2002

(65) Prior Publication Data

US 2003/0080692 A1 May 1, 2003

(30) Foreign Application Priority Data

Aug. 27, 2001 (DE) .......................... 101 40 723

(51) Int. Cl.[7] .............................................. H05B 37/02
(52) U.S. Cl. .................... 315/224; 315/209 R; 315/291
(58) Field of Search ................. 315/244, 307, 315/209 R, 291, 309, DIG. 5, DIG. 7, 106, 107, 101; H05B 37/02

(56) References Cited

U.S. PATENT DOCUMENTS

| | | | | |
|---|---|---|---|---|
| 4,525,648 A | * | 6/1985 | De Bijl et al. .............. 315/224 |
| 5,583,399 A | * | 12/1996 | Rudolph ...................... 315/291 |
| 5,589,740 A | * | 12/1996 | Rudolph et al. ............. 315/291 |
| 5,825,136 A | * | 10/1998 | Rudolph ...................... 315/291 |
| 5,831,396 A |   | 11/1998 | Rudolph ...................... 315/307 |
| 5,925,984 A | * | 7/1999  | Fischer et al. .............. 315/219 |
| 6,051,936 A |   | 4/2000  | Qian .......................... 315/224 |
| 6,268,758 B1 | * | 7/2001 | Limmer et al. ............. 327/424 |

FOREIGN PATENT DOCUMENTS

| | | | | |
|---|---|---|---|---|
| EP | 0 693 864 | * | 1/1996 | .......... H05B/37/02 |
| JP | 06078554 |   | 3/1994 | |
| JP | 07192881 |   | 7/1995 | |

* cited by examiner

Primary Examiner—Don Wong
Assistant Examiner—Trinh Vo Dinh

(57) ABSTRACT

The invention relates to a novel operating circuit for a discharge lamp, in the case of which the lamp electrodes are preheated by driving switching transistors of an oscillator circuit such that their frequencies are detuned with reference to the resonant frequency of the lamp circuit. The drive frequency is defined by an independent resonant circuit.

15 Claims, 1 Drawing Sheet

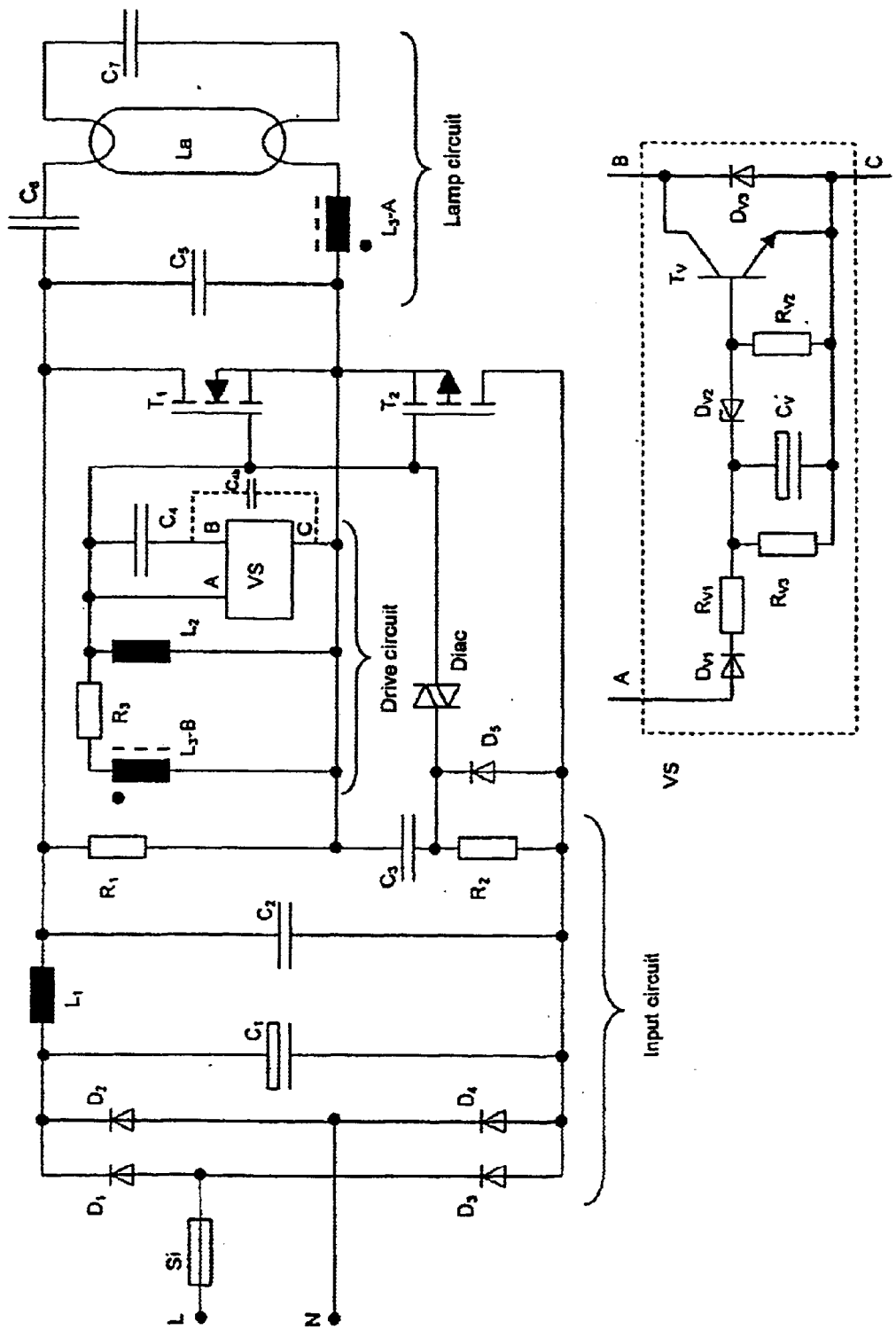

OPERATING CIRCUIT FOR A DISCHARGE LAMP WITH PREHEATABLE ELECTRODES

TECHNICAL FIELD

The invention relates to an operating circuit for a discharge lamp with preheatable electrodes.

BACKGROUND ART

It is generally known that it is necessary in the case of low-pressure discharge lamps for the electrodes, generally incandescent filaments, to be preheated before igniting the discharge. Proper preheating not only eases the starting operation, but is essential, in particular, for the service life of the electrodes.

It is conventional to make use for this purpose of a circuit which is connected in parallel with the discharge path through the discharge lamp and is connected in series with the two electrodes of conventional discharge lamps and includes a parallel circuit composed of a capacitor and a PTC thermistor (PTC element). During a cold start, the PTC thermistor is conducting, and so the capacitor is bridged. The operating circuit applies an operating voltage to the discharge lamp but, owing to the PTC thermistor, said voltage leads to a relatively high current which heats up electrodes or incandescent filaments through which this current flows. After a specific preheating time, the PTC thermistor becomes highly resistive, and so only the reactance of the capacitor is now active.

Consequently, the voltage between the electrodes rises, and so the discharge can be ignited.

This solution is associated with various disadvantages. Firstly, in continuous operation the PTC thermistor results in a power consumption responsible for somewhat impairing the efficiency. Moreover, thermal problems can follow therefrom for ballasts. Secondly, the PTC thermistor requires a comparatively long time, for example two minutes, for cooling after the discharge lamp has been switched off. Thus, when the discharge lamp is switched on again later after being switched off (possibly inadvertently), this restarting is performed without proper preheating of the electrodes. Finally, the capacitor used must be designed for the voltages present at the discharge lamp during ignition, and is therefore a comparatively expensive component. Again, the PTC thermistor is a component which overall increases noticeably the costs of the operating circuit.

The aim is therefore to find alternative possibilities for preheating the electrodes in the discharge lamps.

Such a possibility is outlined in U.S. Pat. No. 5,831,396. It is proposed there for an operating circuit which has a half-bridge oscillator with two bipolar transistors as switching transistors to vary the emitter resistances of these bipolar transistors upon expiry of the preheating time, it thereby being possible to influence the negative feedback in the half-bridge oscillator. It is a technical requirement of the circuit represented there to use a toroidal-core transformer which is saturated in normal operation at different instants as a function of the emitter resistances. Consequently, the variation in the negative feedback influences the operating frequency of the operating circuit. In this case, the operating circuit is designed such that during the preheating it is at an excessively high level with reference to a resonant frequency given by a lamp circuit, and it is not brought to a value which leads to ignition of the discharge lamp until after the preheating time has elapsed in the way described.

DISCLOSURE OF THE INVENTION

The technical problem on which the invention is based is to specify a novel operating circuit for discharge lamps with preheatable electrodes which permits a solution of the preheating of the electrodes which is functionally reliable, flexible and cost-effective.

Provided for this purpose in accordance with the invention is an operating circuit for a discharge lamp with preheatable electrodes, which operating circuit has an oscillator circuit with at least one switching transistor for generating an output power at an RF frequency for the discharge lamp, to be connected to the oscillator circuit, by means of a switching operation corresponding to the RF frequency, the operating circuit being designed such that after the operating circuit has been started the RF frequency of the oscillator circuit is varied such that the discharge lamp does not initially ignite, but a preheating current for preheating the electrodes flows through the electrodes, and after a preheating time, the RF frequency being returned to an operating frequency in the vicinity of a resonant frequency of the oscillator circuit in order to ignite the discharge lamp, characterized in that the RF frequency of the oscillator circuit is determined by at least one dedicated resonant circuit which is connected to a control electrode of the switching transistor, in order to apply control signals at the RF frequency determined by the resonant circuit to the control electrode, the variation in the RF frequency for preheating purposes being performed by a detuning of the natural frequency of the resonant circuit with reference to the resonant frequency of the oscillator circuit.

Preferred refinements of the invention are specified in the dependent claims.

Thus, an independent resonant circuit is used in the invention in order to fix the operating frequency. This resonant circuit is connected to the control electrode of the at least one switching transistor of the oscillator circuit of the operating circuit, and therefore impresses the resonant circuit frequency on the switching operation of the switching transistor, and thus on the overall operating circuit. When more than one switching transistor is provided, it is possible, furthermore, to provide two or more resonant circuits.

In this case, the statement that the resonant circuit or circuits fix the operating frequency must not be understood to the effect that it would thereby be possible to select any desired resonant frequency of a resonant circuit as operating frequency. Since the switching transistors belong to the oscillator circuit, and the latter has a specific resonant frequency, it is possible overall to have as operating frequency only frequencies in a certain environment around this resonant frequency. Thus, if the frequency of the resonant circuit should be very strongly detuned with reference to the resonant frequency of the oscillator circuit, no operation occurs. However, the operation is determined by the frequency of the resonant circuit within a specific environment around the resonant frequency of the oscillator circuit. The resonant circuit and the oscillator circuit are coupled in this case by the driving of the switching transistors, at least. However, it is also preferably provided to feed back energy from the oscillator circuit into the resonant circuit in order to couple energy into the resonant circuit.

The resonant circuit according to the invention is independent with reference to the oscillator circuit to the extent that it fixes an independent frequency and can be tuned independently in frequency and thus, in particular, also be changed, that is to say detuned. The invention now provides to vary the frequency-determining variables directly in the resonant circuit according to the invention, instead of, as proposed in the quoted prior art, influencing the circuitry of the switching transistors, and thus influencing the feedback of the oscillator circuit. The resonant circuit is therefore to be specifically detuned in order to permit the preheating operation. Thus, during the preheating time it is frequency-shifted with reference to the or those operating frequencies which result in ignition of the discharge lamp, and is not varied so that the discharge lamp can ignite until expiry of the preheating time.

It is thereby possible to implement particularly simple and efficient circuits; in particular, there is no need to use the PCT thermistor and the capacitor conventionally connected in parallel therewith.

Moreover, the concept according to the invention is capable of relatively universal use, because the selection of transistors as switching elements in oscillator circuits can be effected in various way, not only in the form of bipolar transistors. In principle, there are no other essential preconditions than the use of at least one switching transistor in the oscillator circuit. The use of a toroidal-core transformer is also not necessary. Rather, a transistor which does not saturate in normal operation is preferred for feedback into the resonant circuit.

A half-bridge arrangement which includes two switching transistors is preferred as oscillator circuit. In this case, a dedicated resonant circuit can be provided per switching transistor. However, it is also possible to find solutions which manage with a single resonant circuit. In particular, the signal of a resonant circuit could be inverted for one of the two switching transistors, while it is applied unchanged at the other one. However, it is preferred to use complementary switching transistors in the half bridge, that is to say to use a pair composed of an npn and a pnp switching transistor or a pair composed of an n-channel and a p-channel FET. The switching elements preferred according to the invention are voltage-controlled, that is to say FETs or IGBTs, in particular MOSFETs.

If a bridge circuit (in the general sense, that is to say including a full bridge) is provided, at least one resonant circuit is preferably provided between the control electrode of the respective switching transistor and the bridge midpoint, as the exemplary embodiment also shows.

The resonant circuit is preferably a resonant circuit in which the frequency is defined by one or more inductances and one or more capacitances, that is to say an LC resonant circuit. As the exemplary embodiment makes plain, the capacitance can also be a transistor input capacitance. A dedicated capacitor is not mandatory.

The detuning of the resonant circuit can be performed in different ways, for example by varying the effective frequency-determining inductance or capacitance. However, it is preferred to switch a capacitance in or out. A switch, in particular a transistor, is therefore provided for this purpose in a section, connected to the capacitance, in the resonant circuit.

In this case, during the preheating the frequency will preferably be higher than the continuous operation frequency, and so the resonant circuit will be detuned toward yet higher frequencies. Thus, when it acts in parallel with other capacitances the above-named capacitance can be switched out during preheating, and so the corresponding line section is interrupted. Upon termination of the preheating time, the section is then switched in, and so the capacitance also determines the frequency. The reverse applies in the case of a series interconnection with other capacitances.

For example, it is possible during preheating to use a small transistor input capacitance, while the capacitance to be switched in upon termination of preheating is present in the form of a dedicated capacitor. Reference is made to the exemplary embodiment.

The preheating time can be defined in various ways. A preferred solution consists in a circuit which recharges a preheating capacitance during the preheating time, and leads to a changeover of the frequency in the resonant circuit when a specific voltage is reached across the capacitance.

The invention fundamentally offers the advantage of a substantially shorter time interval between switching off and switching on again to the accompaniment of proper preheating. In the case of the solution proposed here for defining the preheating time, this time interval can be further shortened if required by virtue of the fact that a discharging resistor is connected in parallel with the preheating capacitance. However, the discharging of the capacitor itself, which is conditioned by the components, can basically already effect sufficiently rapid discharge after the switching off.

The voltage threshold value in the case of the charging of the preheating capacitance can be defined, for example, by a zener diode. The exemplary embodiment shows how, after the conducting-state voltage of the zener diode has been overcome, a transistor is turned on which is arranged in the section situated at the capacitor for frequency detuning (toward the operating frequency). The zener diode then serves the purpose of increasing the threshold voltage prescribed by the transistor.

It is also possible to provide in parallel with the control junction of the transistor a further resistor which renders the circuit less sensitive with regard to fluctuations in the transistor, that is to say approximately in parallel with the emitter-base junction, provided here in the exemplary embodiment, of the bipolar transistor of the preheating circuit.

When the already mentioned switching transistor input capacitances are not sufficient for adequate oscillation of the oscillator circuit during preheating, the described transistor junction, which is interrupted during preheating and is thereafter to be conducting, can be connected in parallel with a relatively small capacitance in order to bring these preheating oscillations to an adequate level and thus to permit an adequate preheating current.

Of course, corresponding solutions are also possible when an inductance is used in the resonant circuit instead of the capacitor for frequency detuning.

The invention is basically directed to operating circuits for discharge lamps, in particular to operating circuits for low-pressure discharge lamps. Consequently, it is preferably applied in ballasts which can be designed separately or in an integrated fashion. A claim is therefore also being made for ballasts, configured according to the invention, for tubular fluorescent lamps which are designed separately as a rule. On the other hand, the invention is also directed to ballasts for compact fluorescent lamps, specifically both as separate ballasts and as integrated ones. In the latter case, the complete compact fluorescent lamp is therefore being claimed.

BRIEF DESCRIPTION OF THE DRAWING

Represented in more detail below is an exemplary embodiment according to the invention which serves to illustrate the various features according to the invention. The individual features disclosed in this case can also be essential to the invention in other combinations as illustrated. As a precaution, it is pointed out that the invention could be claimed not only within the scope of product claims, but also within the scope of method claims, and thus that the preceding and following disclosure is therefore also to be read and understood with regard to method features.

BEST MODE FOR CARRYING OUT THE INVENTION

The FIGURE shows a circuit diagram of an exemplary embodiment for an operating circuit according to the invention.

In the drawing, La denotes a low-pressure discharge lamp, it being illustrated diagrammatically that two incandescent filaments are connected into the part of the operating circuit denoted as lamp circuit in the figure. The incandescent filaments are connected via a capacitor $C_7$, which serves as resonance capacitor. In the case of conventional circuits for preheating the electrodes, a parallel circuit composed of a further capacitor and a PTC thermistor is connected in series with the resonance capacitor $C_7$, in order to ensure that the electrodes are preheated in the way already described. This further capacitor and the PTC thermistor are no longer required in the invention.

The discharge lamp La is supplied as follows: a fuse Si is connected to the mains input (domestic mains voltage) denoted by L and N. Following this is a rectifier comprising the diodes $D_1$ to $D_4$, the output of which rectifier has a smoothing capacitor $C_1$. $L_1$ denotes a filter inductor and $C_2$ a capacitor; together, the two assemblies form an interference suppressor. There follows the actual oscillator circuit with two switching transistors $T_1$ and $T_2$, more specifically MOSFET transistors. The assemblies $R_1$, $R_2$, $C_3$, $D_5$ and the diac form a starting circuit which is known per se. In the case of this starting circuit, after mains voltage has been applied to the terminals L and N the capacitor $C_3$ is recharged until a breakdown voltage is present at the diac and said voltage provides a first drive pulse for the switching transistors $T_1$ and $T_2$. In the further operation, the connection of the capacitor $C_3$ prevents the latter from resupplying a drive pulse. The mode of operation of the starting circuit is immaterial for the present invention.

The discharge lamp La is connected via a resonance inductance $L_3$-A to the centre tap between the two switching transistors $T_1$ and $T_2$, which form a half bridge, and connected at the other electrode via a decoupling capacitor $C_6$ to the upper supply branch in the FIGURE, that is to say one of the two outer terminals of the half bridge.

The resonance inductance $L_3$-A, the decoupling capacitor $C_6$ and the resonance capacitor $C_7$ form a series resonant circuit. The capacitor $C_5$ serves merely to relieve the switching transistors $T_1$ and $T_2$, and contributes to the interference suppression.

The switching transistors are driven via the drive circuit, thus denoted in the figure, whose component VS is expressly illustrated in the lower part of the FIGURE and is responsible for preheating the electrodes of the discharge lamp La. In continuous operation, the emitter-collector section of the transistor $T_V$ is turned on in the preheating circuit VS such that the two points B and C are connected. In this state, the drive circuit forms an independent resonant circuit with the inductance $L_2$ and the capacitance $C_4$. When, on the other hand, the emitter-collector section of the transistor $T_V$ is open, the resonant circuit in the drive circuit comprises only the inductance $L_2$ together with the transistor input capacitances of the switching transistors $T_1$ and $T_2$. If the transistor input capacitances do not suffice for the functioning, explained further below, of the resonant circuit in this state, the auxiliary capacitor $C_{4b}$ illustrated by dashes in the FIGURE can be inserted, and forms a suitable (comparatively small) total capacitance in series connection with the capacitor $C_4$.

In this exemplary embodiment, the control circuit is provided only once and connected to the control electrodes of both switching transistors $T_1$ and $T_2$. This is possible because, as the graphical symbols in the figure make plain, the switching transistors are complementary ones.

It is also to be seen that a winding $L_3$-B is connected via the resistor $R_3$ to the resonant circuit in the drive circuit, this winding $L_3$-B being coupled to the already mentioned resonance inductance $L_3$-A in the lamp circuit. This can be a transformer (not saturating in normal operation) here, but two inductances can also be mounted efficiently close to one another as to produce a magnetic coupling. The coupling serves for synchronizing the oscillations of the drive circuit and the remaining oscillator circuit, and for feeding energy into the resonant circuit. The circuit diagram shows that, specifically, the resonant circuit in the drive circuit defines an independent frequency with reference to the lamp circuit with the emitter-collector sections of the switching transistors $T_1$ and $T_2$. A system of two coupled oscillators is produced by the coupling via the inductances $L_3$-A and $L_3$-B and the control electrodes of the switching transistors $T_1$ and $T_2$. This is utilized for the purpose of firstly preheating the discharge lamp La after starting (starting pulse of the diac) by virtue of the fact that the emitter-collector section of the transistor $T_V$ in the preheating circuit VS remains open, and thus the resonant circuit composed of the inductance $L_2$ and the input capacitances of the switching transistors $T_1$ and $T_2$, or the overall capacitance $C_4$ in series with $C_{4b}$ oscillates at a somewhat higher frequency with reference to the natural frequency of the series resonant circuit in the lamp circuit. However, in this case the frequency prescribed by the resonant circuit is detuned upward with reference to the natural frequency of the series resonant circuit only to the extent that the oscillator circuit also oscillators to a certain extent, that is to say energy is also fed back into the resonant circuit via the transformer. Because of the frequency detuning, no adequate voltage rise occurs in the lamp circuit between the electrodes, and so the discharge lamp La is not triggered. Instead, a preheating current flows through the electrodes as a consequence of the forced oscillation in the oscillator circuit.

Moreover, if the transistor input capacitances of the switching transistors $T_1$ and $T_2$ should, together with the inductance $L_2$, define a natural frequency, already close to ignition frequency, of the resonant circuit in the drive circuit, then either the inductance $L_2$ could be varied, or an additional damping could be undertaken.

If, now, a preheating time whose technical implementation is yet to be considered in detail, has expired, the emitter-collector section of the transistor $T_V$ is switched on, and so the frequency of the resonant circuit in the drive circuit is determined by the inductance $L_2$ together with the capacitance $C_4$. This frequency is in the vicinity of the resonant frequency of the remaining oscillator (that is to say of the series resonant circuit of the lamp circuit together with the switching paths of the switching transistors $T_1$ and $T_2$).

As a consequence of the resonant increase, this produces between the already preheated electrodes a voltage sufficient to ignite the discharge lamp La, and so the discharge lamp La is triggered. As soon as the ignition has occurred, the discharge lamp La forms a parallel current path to the resonance capacitor $C_7$, such that only relatively slight currents still flow through the electrodes to the capacitor $C_7$.

The switching operation of the transistor $T_V$, which firstly switches out the capacitance $C_4$ and then switches it in, is controlled in the following way: a capacitor $C_V$ entered in the detailed illustration of the preheating circuit VS is recharged starting from a point A via a diode $D_{V1}$ and a resistor $R_{V1}$ until the sum of the required base-emitter voltage and the breakthrough voltage of a zener diode $D_{V2}$ is reached.

One side of the capacitor $C_V$ is connected via this zener diode $D_{V2}$ to the control electrode (the base of the bipolar transistor $T_V$), while the other side of the capacitor $C_V$ is connected to another terminal (the emitter) of the transistor $T_V$. As a result, the capacitor voltage is applied to the emitter-base junction such that the emitter-collector section of the transistor $T_V$ is turned on. However, as long as the breakthrough voltage of the zener diode $D_{V2}$ is not reached the base and the emitter of the transistor $T_V$ are short circuited via the resistor $R_{V2}$ such that the emitter-collector section remains open. The diode $D_{V3}$ is, moreover, a freewheeling diode customary for connecting bipolar transistors.

Moreover, connected in parallel with the capacitor $C_V$ is a discharge resistor $R_{V3}$ which, after the entire operating circuit is switched off, discharges the capacitor again in a very short time interval for the use of the discharge lamp La, and thus permits the discharge lamp La to be switched on again briefly with proper preheating. On the other hand, discharging of the transistor $T_V$ due to this resistor $R_{V3}$ is slow enough to design the discharging to be weak enough by comparison with the charging operations by the diode $D_V$ and the resistor $R_{V1}$.

The resistor $R_{V1}$ brakes the recharging of the capacitor $C_V$ and thereby serves to define the preheating time together with the capacitance of the capacitor and the breakdown voltage of the diode $D_{V2}$.

The resistor $R_{V2}$ also serves to avoid excessively strong functional relationships between scatter bands of different individual transistors $T_V$.

Overall, the operating circuit from the FIGURE in conjunction with the discharge lamp La should be an integrated solution, that is to say, for example, a compact fluorescent lamp with a ballast integrated in the cap. However, the circuit can be applied just as effectively to separate solutions in the case of which a discharge lamp La can be connected with its electrodes to corresponding terminals of the operating circuit. Moreover, instead of the illustrated supply via the mains voltage to be applied to the terminals L N, it would also be possible, of course, to provide another supply, for example from a battery, in which case the rectifier could then be eliminated.

What is claimed is:

1. An operating circuit for a discharge lamp with preheatable electrodes, comprising:
   an oscillator circuit comprising at least one switching transistor ($T_1$, $T_2$);
   a series resonant circuit ($C_6$, $C_7$, $L_3$-A) coupled between the oscillator circuit and the discharge lamp (La), the series resonant circuit comprising a decoupling capacitor ($C_6$), a resonance capacitor ($C_7$), and a resonance inductor ($L_3$-A); and
   a drive circuit coupled to the at least one switching transistor ($T_1$, $T_2$), the drive circuit comprising:
      an inductor ($L_3$-B) magnetically coupled to the resonance inductor ($L_3$-A) of the series resonant circuit ($C_6$, $C_7$, $L_3$-A);
      an independent resonant circuit ($L_2$, $C_4$) coupled between the inductor ($L_3$-B) and the at least one switching transistor ($T_1$, $T_2$) of the oscillator circuit, the independent resonant circuit comprising an independent resonant inductor ($L_2$) and an independent resonant capacitor ($C_4$);
   a preheating circuit (VS) coupled in series with the independent resonant capacitor ($C_4$), the preheating circuit (VS) having first, second, and third terminals (A, B, C), wherein the first terminal (A) is coupled to a junction between the independent resonant inductor ($L_2$) and the independent resonant capacitor ($C_4$), and the second terminal (B) is coupled to the independent resonant capacitor ($C_4$), the preheating circuit (VS) being operable:
      (i) during preheating of the preheatable electrodes of the discharge lamp (La), to switch out the independent resonant capacitor ($C_4$); and
      (ii) after completion of preheating of the preheatable electrodes of the discharge lamp (La), to switch in the independent resonant capacitor ($C_4$) by effectively providing an approximate short circuit between the second and third terminals (B, C).

2. The operating circuit of claim 1, wherein the preheating circuit (VS) is operable to switch out the independent resonant capacitor ($C_4$) during preheating by effectively providing an approximate open circuit between the second and third terminals (B, C).

3. The operating circuit of claim 1, wherein the preheating circuit (VS) is operable to switch in the independent resonant capacitor ($C_4$) after completion of preheating by effectively providing an approximate short circuit between the second and third terminals (B, C).

4. The operating circuit of claim 1, wherein the preheating circuit (VS) comprises a transistor ($T_V$) coupled between the second and third terminals (B, C) of the preheating circuit (VS), the transistor ($T_V$) having a control electrode.

5. The operating circuit of claim 4, wherein the preheating circuit (VS) further comprises a resistor ($R_{V2}$) coupled to the control electrode of the transistor ($T_V$) for rendering the preheating circuit (VS) less sensitive to variations in the electrical properties of the transistor ($T_V$).

6. The operating circuit of claim 4, wherein the preheating circuit (VS) further comprises a preheating capacitor ($C_V$) for delaying activation of the transistor ($T_V$) until completion of preheating the preheatable electrodes.

7. The operating circuit of claim 6, wherein the preheating circuit (VS) further comprises a discharging resistor ($R_{V3}$) coupled in parallel with the preheating capacitor ($C_V$).

8. The operating circuit of claim 6, wherein the preheating circuit (VS) further comprises a zener diode ($D_{V2}$) coupled between the preheating capacitor ($C_V$) and the control electrode of the transistor ($T_V$).

9. The operating circuit of claim 6, wherein the preheating circuit (VS) further comprises a series combination of a diode ($D_{V1}$) and a resistor ($R_{V1}$), the series combination being coupled between the first terminal (A) and the preheating capacitor ($C_V$).

10. The operating circuit of claim 1, wherein the drive circuit further comprises an auxiliary capacitor ($C_{4b}$) coupled between the second and third terminals (B, C) of the preheating circuit (VS).

11. The operating circuit of claim 1, wherein the oscillator circuit is a bridge circuit.

12. The operating circuit of claim 1, wherein the at least one switching transistor ($T_1$, $T_2$) of the oscillator circuit is a MOSFET.

13. The operating circuit of claim 1, wherein the oscillator circuit is a half-bridge circuit with two switching transistors ($T_1$, $T_2$).

14. The operating circuit of claim 13, wherein the two switching transistors ($T_1$, $T_2$) of the half-bridge circuit are complementary transistors.

15. The operating circuit of claim 1, wherein the discharge lamp (La) is one of:
   (i) a tubular fluorescent lamp; and (ii) a compact fluorescent lamp.

* * * * *